June 16, 1942. R. W. RADEKE 2,286,931
CUTTER FOR DRESSING ELECTRODES IN A SPOT WELDING MACHINE
Filed July 22, 1938
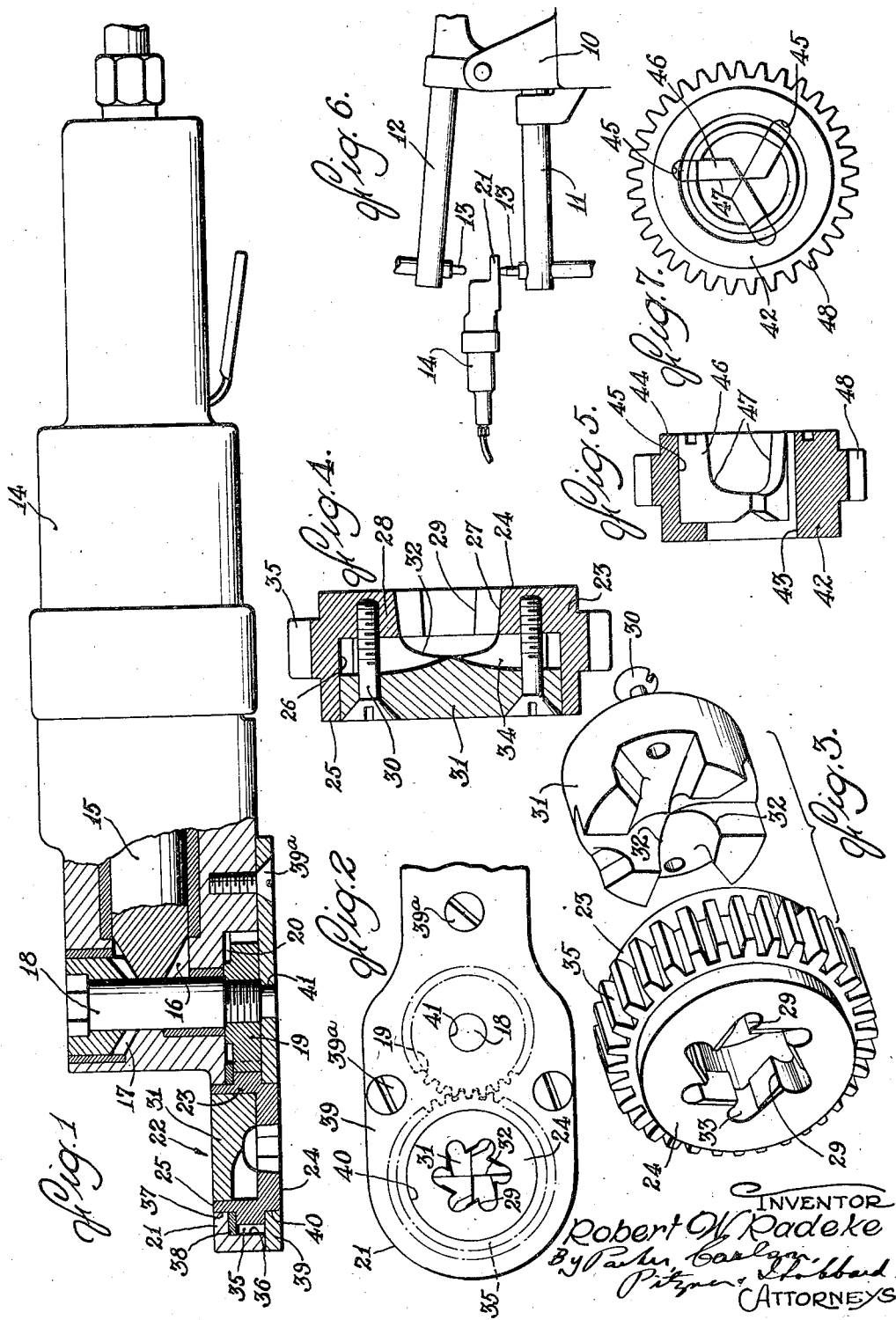
INVENTOR
Robert W. Radeke
ATTORNEYS Patented June 16, 1942

2,286,931

UNITED STATES PATENT OFFICE 2,286,931

CUTTER FOR DRESSING ELECTRODES IN SPOT WELDING MACHINES

Robert W. Radcke, Grand Haven, Mich., assignor to William H. Keller, Inc., Grand Haven, Mich., a corporation of Michigan Application July 22, 1938, Serial No. 220,667

15 Claims. (Cl. 90—12)

The invention relates to cutters for dressing electrodes in a spot welding machine or the like and has as a general aim the provision of an electrode dressing device which is especially adapted for trimming or reshaping the electrodes while they remain operatively installed in the machine.

In use, the noses or opposed end portions of the electrodes in spot welding machines spread and become distorted, requiring relatively frequent trimming or dressing to reshape the electrodes for proper and efficient operation. Heretofore, it has been customary to remove the electrodes from the machine and dress them on a lathe, the machine on each occasion being inoperative for an appreciable period of time.

An object of the invention is to provide a new and improved device of this character which is so shaped and dimensioned that a power driven cutter element of novel form may be inserted between the opposed electrodes in a spot welding machine and brought into endwise engagement with the outer end of an electrode to be dressed without disassembly of the electrode installation.

More specifically stated, another object is to provide a novel device of this nature which embodies a relatively thin tool adapted to be driven through its periphery, said tool being supported by means of approximately the same thickness dimension for rotation in engagement with an electrode end, the tool having cutters shaped to produce a desired contour of electrode end.

Another object is to provide a novel cutter for the purpose set forth in which the cutting elements are arranged, when operatively engaged with the end of an electrode, to produce substantially an axially alined relationship between the cutter and the electrode end and maintain these parts in proper operative association.

Another object is to provide a new and improved electrode dressing cutter in the form of a relatively thin disk having an axial socket into which extend cutting elements arranged properly to shape the end of an electrode, and having peripheral means for connection with a driving member.

Other objects and advantages will become apparent in the following description and from the accompanying drawing, in which:

Figure 1 is a side view partially in axial section of a device embodying the features of the invention.

Fig. 2 is a view of the head portion of the device looking toward the bottom face thereof.

Fig. 3 is a view in perspective of a cutter element illustrating the parts thereof in disassembled relation.

Fig. 4 is an axial section on an enlarged scale through the assembled cutter element.

Fig. 5 illustrates in axial section a modified form of cutter.

Fig. 6 shows fragmentarily a spot welding machine having a device embodying the present invention operatively associated with one of the electrodes.

Fig. 7 is a face view of the modified form of cutter element shown in Fig. 5.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention will, for illustrative purposes, be considered as being embodied in a device for trimming the electrodes of a spot welding machine while the electrodes remain operatively installed in the machine. A conventional type of spot welding machine is fragmentarily illustrated in Fig. 6 as comprising a support 10 which is usually in the form of an upright pedestal having an arm 11 fixed to extend horizontally therefrom. Pivoted to the support is a movable arm 12 normally disposed with its outer end in spaced relation to the fixed arm 11 and adapted to be swung by suitable mechanism (not shown) toward and away from the fixed arm. Each of the arms 11 and 12 carries an electrode 13 arranged in opposition and adapted to be moved from an inoperative, rather narrowly spaced relation, as shown in Fig. 6, into an opposed operative relation. The electrodes 13 are rigidly, but detachably, mounted on their respective arms and it usually requires a rather considerable period of time to install or detach the electrodes. For proper operation, the electrodes should have smoothly rounded outer ends or noses, but in use these ends spread and become distorted. Heretofore, the electrodes have usually been reshaped by removing them from the spot welding machine and dressing them on a lathe or the like. On occasion, the electrodes have been reshaped by dressing them with a file. This method however is only a temporary expedient and is generally unsatisfactory. In either case, the spot welding machine is rendered inoperative for substantial periods of time and, since these idle periods occur relatively frequently, substantial diminution thereof is important.

According to the present invention a device is provided in the nature of a portable tool which embodies a suitable prime mover for driving an electrode cutting or dressing element, the device being so constructed and arranged that the ends of the electrode may be conveniently, accurately and expeditiously dressed without disassembly thereof from the spot welding machine.

Referring to Fig. 1, the device in the present instance includes an elongated casing 14 which houses a prime mover such as a compressed air motor of suitable, conventional construction. The motor is arranged to drive a spindle 15 which is journaled in the front end of the housing and carries a bevel gear 16 for engagement with a complemental gear 17 on a stub shaft 18. The shaft 18 is journaled in the housing at right angles to the axis of the shaft 15 and at one side of the housing carries a pinion gear 19 disposed for rotation in a recess 20 in the side of the housing. Endwise of the recess 20, the housing has an integral extension 21 which is thin, relatively flat, and provides a support for a rotatable cutter, generally indicated at 22.

As shown best in Figs. 3 and 4, a preferred form of cutter comprises a thin, flat, circular disk 23 having a front face 24 and a rear face 25 (Fig. 4). The rear face has an enlarged axial recess 26 of substantial depth and a communicating axial bore 27 of smaller diameter extends through the wall 28 provided by the formation of the recess 26. The peripheral margin of the bore 27 is shaped in any suitable manner to provide a series of equally spaced, inwardly extending cutters 29. Four equidistantly spaced cutters are herein shown as having cutting edges arranged to define, in operation, a substantially cylindrical but slightly tapering contour. These cutters shape the substantially cylindrical portion of the electrode immediately adjacent to the operative end thereof and guide the tool with respect to the electrode.

Detachably secured in and closing the recess 26, as by screws 30, is a disk 31 having on its inner face a series of cutters 32 having cutting edges arranged in assembly to complement the cutting edges of the cutters 29. The cutters 32 are formed integrally with the disk 31 and the cutting edges thereof are turned inwardly to meet approximately on the axis of the cutter and define in operation the smoothly rounded nose contour of an electrode. Preferably the cutting edges of the cutters 29 and 32 are, as shown in Fig. 2, in offset or staggered relation as distinguished from alinement since this arrangement appears to reduce any tendency of the cutter to chatter. On each side of the cutting edges of the elements 29 and 32, the wall 28 and the disk 31 are properly relieved, as indicated at 33 (Fig. 3) and 34 (Fig. 4) respectively.

Peripherally the body 23 carries a gear element 35 which is narrower than the thickness dimension of the disk, is located between the front and rear faces thereof, and while it may be otherwise secured to the body is, in the present instance, formed integrally with the disk. This gear element is arranged to mesh with the driven pinion gear 19 on the stub shaft 18.

The housing extension 21 is recessed, as at 36, from its front side to receive the ring gear portion of the cutter and the recess continues on a reduced diameter through the rear side of the extension, as at 37, to provide a bore dimensioned to receive the rear portion of the disk 23 beyond the side of the gear. The recess 36 is of sufficient depth to receive a thrust washer 38 as well as the gear. The cutter element is retained in the recess by a face plate 39, secured to the housing and to the extension by such means as screws 39ª. The plate is bored as at 40 to receive the front portion of the disk 23 with the margin of the plate in running abutment with the front side of the gear. The plate 39 extends rearwardly of the housing to close the recess 20 and conceal the pinion gear 19. The plate may be bored, as at 41, to provide an end bearing for the stud shaft 18.

By this arrangement, the electrode cutter is supported at the front end of the device by means which is no thicker than the overall thickness of the cutter. By the present construction, a relatively thin cutter is obtained, the thickness dimension of which is substantially less than the normal distance between the cooperating electrodes in a spot welding machine. Consequently the extension and the cutter supported thereby may be inserted bodily between the electrodes and then moved endwise into operative engagement with the end of either electrode. Since the cutting edges are, as it were, located in a socket in the cutter body, and because the cutting edges 29 have a relatively long engagement with the end portion of the electrode, the operator has no difficulty in effecting and maintaining a proper engagement between the cutter and the electrode. Moreover, the cutting edges 29 act as guides which tend to maintain a proper axial alinement between the electrode end and the cutter.

In Figs. 5 and 7, a slightly modified form of cutter is shown wherein a disk-like body 42 has an axial bore 43 extending therethrough. From the front face 44 of the body, a series of equidistantly spaced slots 45 extend rearwardly to receive detachable blades 46. The blades are generally L-shaped in form and each has a cutting edge 47 shaped according to the outside longitudinal contour of the nose portion of an electrode. In this form, only three blades are shown and the blades are arranged so that the cutting edges 47 meet and terminate substantially on the axis of the cutter. This form of cutter has a peripheral gear 48 similar to the gear 35 on the first described form. The cutter shown in Figs. 5 and 7 may be mounted in the device in the manner previously described. It will be noted, with reference to Fig. 5, that in this form the cutting edges 47 adjacent to the front face of the cutter are of substantial length in a generally axial direction for engagement with the side portion of the electrode end adjacent to the nose for maintaining a proper alinement between the cutter and the electrode.

It will be evident from the foregoing that a novel device has been provided by which the operative end portions of an electrode may be properly dressed quickly and efficiently without removing the electrodes from the machine. In use, it is only necessary for the operator to insert the extension into the gap between the electrodes and advance the socket in the cutter into endwise engagement with an electrode. This engagement may be readily effected with either of the electrodes. As the engagement is effected, the device is manipulated to drive the cutter and only a relatively short application of the cutter to the electrode end is necessary to dress the electrode properly. The relationship between the cutter and the electrode end is substantially self-maintaining due to the shape of the cutting edges.

I claim as my invention:

1. A cutter for dressing electrodes in a spot welding machine having, in combination, a body in the form of a thin disk having an axial opening, cutters extending into said opening from the walls thereof and having cutting edges which extend for a part of their length in a direction generally axially of the body and then turn inwardly of the opening to meet on said axis, the axially extending parts of the cutting edges being adapted to shape the generally cylindrical portion of an electrode end and to maintain the cutter in axial alinement with the electrode, the inturned parts of said edges being adapted properly to shape the end face of the electrode, and a gear element disposed circumferentially of said body and having a driving connection therewith.

2. A cutter for dressing electrodes in a spot welding machine having, in combination, a body in the form of a thin disk having an axial opening, cutters extending into said opening having cutting edges which extend for a part of their length in the direction of the axis of the body and then turn inwardly of the opening to meet on said axis, the axial parts of the cutting edges being adapted to shape the cylindrical portion of an electrode end and to maintain the cutter in axial alinement with the electrode, the inturned parts of said edges being adapted properly to shape the end face of the electrode, and a gear element disposed circumferentially of said body in driving relation thereto.

3. A cutter for dressing electrodes in a spot welding machine having, in combination, a body in the form of a thin disk having an axial opening, cutting elements extending into said opening from the walls thereof and having cutting edges which extend substantially parallel to the axis of the body for shaping the cylindrical portion of an electrode end and for maintaining the cutter in axial alinement with the electrode, a member closing the rear of said opening having cutting elements provided with cutting edges supplementing said first mentioned cutting edges and shaped to form the end face of the electrode, and a gear element disposed circumferentially of said body and having a driving connection therewith.

4. A cutter of the character described having, in combination, a cutter body having an opening therein providing a socket, a series of spaced cutter elements extending into said socket and shaped to form the side of a part to be dressed, and a second series of spaced cutter elements extending into said socket and shaped to form the end of said part, the cutter elements in one series being out of alignment with the cutter elements in the other series.

5. A cutter for dressing electrodes in a spot welding machine having, in combination, a body in the form of a thin disk having an axial opening, blades having cutting edges shaped to correspond with the longitudinal contour of the operative end of an electrode, said body having blade receiving slots spaced circumferentially of said axial opening to receive said blades and support them with the cutting edges thereof disposed in said opening, said cutting edges in assembly on said body meeting substantially on the axis of said opening, and an annular gear element concentric with said body and having a driving connection therewith.

6. A dressing device for an electrode of a spot welding or like machine having, in combination, a relatively thin disk having an axial socket, cutting means on said disk for material removal from a member inserted into said socket, supporting means for said disk of substantially no greater thickness than the thickness of said disk, and means for rotating said disk including a gear element rigid with and extending circumferentially of said disk.

7. A dressing device for an electrode of a spot welding or like machine having, in combination, a relatively thin disk having an axial socket, cutting means on said disk for material removal from a member inserted into said socket, supporting means for said disk of substantially no greater thickness than the thickness of said disk, and means having a driving engagement with the periphery of the disk for rotating the same.

8. A dressing device for an electrode of a spot welding or like machine having, in combination, a relatively thin disk having an axial socket, dressing cutters extending into said socket, a rigid peripheral gear element, means engaging said disk peripherally for rotatably supporting said disk, and driving means including a gear in mesh with said gear element.

9. A dressing device for an electrode of a spot welding or like machine having, in combination, a tool support including a relatively thin head having a recess therein, a disk-shaped tool mounted in said recess for rotational movement relative to the head, said tool having an axial socket therein, electrode dressing cutters on said tool extending into said socket, and means having a peripheral engagement with said tool for rotating it.

10. An electrode dressing device of the character described having in combination, a portable tool including a thin, substantially flat tool supporting head, a rotary tool mounted within the confines of said head and having a socket for the reception of an electrode end, cutting elements on said tool extending into said socket, and having means peripherally engaging said tool.

11. A dressing device for an electrode of a spot welding or like machine having, in combination, a relatively thin disk having an axial socket, dressing cutters extending into said socket, and a gear of less width than the thickness of said disk rigid with said disk and located intermediate the flat faces thereof, supporting means encircling said disk and having running engagement therewith on opposite sides of said gear, and drive means engaging said gear.

12. A cutter for dressing electrodes in a spot welding machine having, in combination, a thin circular body having a central opening, cutting elements extending into said opening and having cutting edges disposed radially of the axis of the body for shaping the side portion of an electrode nose, means secured to the body and traversing the opening adjacent to said cutting edges and having cutting elements provided with cutting edges supplementing said first mentioned cutting edges and shaped to form the end face of the electrode, and means having a driving engagement with the periphery of the body for rotating the same.

13. A portable electrode dresser comprising, in combination, a disk having an annular series of cutting elements coacting to define centrally of the disk a recess for the reception of the tip end of an electrode to be dressed, a supporting structure comprising a thin flat head having an opening therein for receiving the disk and providing axially spaced bearing surfaces at the edges of the opening, said disk also having axially spaced bearing surfaces coacting with the bearing surfaces on said head to hold the disk against axial movements in the head, and means having a peripheral driving engagement with said disk between the axially spaced bearing surfaces thereof.

14. A portable electrode dresser comprising, in combination, a disk having an annular series of cutters coacting to form centrally of the disk a recess for the reception of an electrode to be dressed, a structure for rotatably supporting the disk comprising a thin flat member having a central opening therein, said disk and member having coacting bearing surfaces holding the disk against movement in one direction axially of said opening, said member having removably secured thereto a cover plate centrally apertured to expose said cutting elements on the disk and engaging with the disk to hold it against axial movement in the opposite direction, and means having a peripheral driving engagement with the disk for rotating the same including an element underlying said cover plate.

15. A portable electrode dresser comprising, in combination, a cylindrical body having a recess in one end, a disk rigidly secured in said recess and having cutting teeth on its inner face, said body having a central opening in its opposite end exposing said cutting teeth, and an annular series of cutting teeth projecting radially into said opening and adapted to shape the side portion of the electrode adjacent the tip end thereof, the cutting teeth on said disk being adapted to shape the extreme end surface of the electrode tip.

ROBERT W. RADEKE.

CERTIFICATE OF CORRECTION.

Patent No. 2,286,931.   June 16, 1942.

ROBERT W. RADEKE.

It is hereby certified that error appears in the printed specification of the above numbered patent requiring correction as follows: Page 3, second column, line 48, claim 10, for "having" read --driving--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.